US008871063B2

(12) United States Patent
Panza (10) Patent No.: US 8,871,063 B2
(45) Date of Patent: Oct. 28, 2014

(54) PROCESS FOR SELECTIVE REMOVAL OF A PRODUCT FROM A GASEOUS SYSTEM (75) Inventor: Sergio Panza, Como (IT)

(73) Assignee: Casale SA (CH)

( * ) Notice: Subject to any disclaimer, the term of this patent is extended or adjusted under 35 U.S.C. 154(b) by 0 days.

(21) Appl. No.: 13/697,724

(22) PCT Filed: Jun. 10, 2011

(86) PCT No.: PCT/EP2011/059655
§ 371 (c)(1),
(2), (4) Date: Nov. 13, 2012

(87) PCT Pub. No.: WO2012/000771
PCT Pub. Date: Jan. 5, 2012

(65) Prior Publication Data
US 2013/0087444 A1  Apr. 11, 2013

(30) Foreign Application Priority Data

Jun. 30, 2010  (EP) .................................... 10168010

(51) Int. Cl.
*B01D 53/32* (2006.01)
*C01C 1/04* (2006.01)
*B01J 8/00* (2006.01)
*B01J 8/04* (2006.01)
*B01J 8/02* (2006.01)

(52) U.S. Cl.
CPC .............. *B01D 53/32* (2013.01); *C01C 1/0458* (2013.01); *C01B 2210/0012* (2013.01); *B01J 8/009* (2013.01); *B01D 53/323* (2013.01); *B01J 8/0415* (2013.01); *C01B 2210/0046* (2013.01); *C01B 2210/001* (2013.01); *B01J 8/0257* (2013.01); *C01C 1/0441* (2013.01); *C01B 2210/0053* (2013.01); *B01J 8/0214* (2013.01); *B01D 2313/42* (2013.01)
USPC ......... 204/157.3; 204/547; 204/643; 204/647

(58) Field of Classification Search
CPC ............... B01D 53/04; B01D 53/0415; B01D 53/0423; B01D 53/228; B01D 53/229; B01D 53/32; B01D 53/323; B01D 53/326; B01D 2259/818; B03C 9/00; B03C 11/00; B03C 2201/00; B03C 2201/14; B03C 2201/16
USPC .............. 204/157.3, 547, 643, 647; 95/80, 81
See application file for complete search history.

(56) References Cited

U.S. PATENT DOCUMENTS 3,489,670 A * 1/1970 Maget et al. ................... 205/343

(Continued)

FOREIGN PATENT DOCUMENTS

EP  0 984 500 A2  3/2000
JP  2 002819 A  1/1990

(Continued)

OTHER PUBLICATIONS

International Search Report issued in connection with PCT/EP2011/059655.

(Continued)

*Primary Examiner* — J. Christopher Ball
(74) *Attorney, Agent, or Firm* — Akerman LLP (57) ABSTRACT A process for selective removal of a gaseous product (P) from a gaseous system comprising said product and other components (R1, R2), wherein the gaseous system is admitted to a first environment, which is separated from a second environment by a boundary wall, and a permeation membrane (3, 300) forms at least part of said boundary wall; a spatially non-uniform electric field (4) is generated between a first electrode or first plurality of electrodes (1, 301) located in the first environment and a second electrode or second plurality of electrodes (2, 302) located in the second environment, so that field lines of said non-uniform electric field cross said membrane, and a dielectrophoretic force generated on particles of said gaseous component (P) is at least part of a driving force of the permeation through said membrane, an amount of said product (P) being selectively removed from the first environment and collected in the second environment.

15 Claims, 7 Drawing Sheets

(56) References Cited

U.S. PATENT DOCUMENTS

| | | |
|---|---|---|
| 4,735,780 A | 4/1988 | Noe |
| 4,762,535 A | 8/1988 | Pez et al. |
| 4,795,617 A | 1/1989 | O'Hare |
| 4,999,998 A | 3/1991 | Akerib |
| 5,843,288 A | 12/1998 | Yamamoto |
| 7,588,740 B1 | 9/2009 | Guarino et al. |
| 2002/0134663 A1 | 9/2002 | Zur Megede |
| 2004/0022701 A1 | 2/2004 | Segal et al. |
| 2008/0029395 A1 | 2/2008 | Fan |
| 2008/0050300 A1 | 2/2008 | Nakamura et al. |
| 2008/0202341 A1 | 8/2008 | Poole et al. |
| 2009/0246572 A1 | 10/2009 | Dahlberg et al. |

FOREIGN PATENT DOCUMENTS

| | | |
|---|---|---|
| JP | 2 006817 A | 1/1990 |
| WO | 2009/025835 A1 | 2/2009 |
| WO | 2010/088579 A2 | 8/2010 |

OTHER PUBLICATIONS

International Preliminary Report on Patentability issued in connection with PCT/EP2011/059655.

European Search Report issued in connection with EP 10168010, Mar. 2011.

Dytnerskii, Y.I., "The Use of Electric Current for Enhancing the Efficiency of Pressure-Driven Membrane Processes", Pure and Applied Chemistry, vol. 58, No. 12, Jan. 1, 1986, pp. 1627-1636.

* cited by examiner

PROCESS FOR SELECTIVE REMOVAL OF A PRODUCT FROM A GASEOUS SYSTEM

This application is a national phase of PCT/EP2011/059655, filed Jun. 10, 2011, and claims priority to EP 10168010.6, filed Jun. 30, 2010, the entire contents of both of which are hereby incorporated by reference.

FIELD OF THE INVENTION

The invention relates to methods for carrying out chemical reactions and related reactors. The invention relates in particular to selective removal of a gaseous component of a gaseous system. More in detail the invention allows selective removal of reaction products from a gaseous system comprising reagents and products. The invention is applicable to several processes including: synthesis of ammonia, methanol, DME, nitric acid, sulphuric acid, which are cited as non limitative examples. The invention discloses also a reactor adapted to carry out said process of selective removal.

PRIOR ART

Removal of reaction products is a known measure to increase the yield of a chemical reaction. By removing products form the evolving system, the rate of the "direct" reaction of conversion, from left to right in the usual notation, is enhanced.

A known technique for removing products is the membrane-based selective permeation. For example, reactors for production of hydrogen often make use of membrane-based selective removal of hydrogen.

The membrane has micro pores sized to allow the selective permeation. Hence, the membrane-based selective permeation is sensitive to the physical size of molecules, as smaller molecules are allowed to pass more easily through the membrane. Selective removal of hydrogen, for example, is made possible due to small size of the molecule of $H_2$. This means that a membrane-based system has a poor efficiency (i.e. is less selective) when products and reagents have a comparable molecular size, and is even less efficient when a product has a molecular size smaller than one or more of reagents.

For example, the size of the ammonia ($NH_3$) molecule is 2.90 Angstrom (A) which is between the size of molecular hydrogen (2.83 A) and size of molecular nitrogen (3.78 A) and, thus, a selective removal of $NH_3$ with conventional membranes is not efficient, because a significant amount of hydrogen would escape from the system, together with ammonia. The same happens e.g. in the synthesis of methanol since the size of the molecule $CH_3OH$ is comparable with that of carbon oxide and carbon dioxide and, then, membrane-based selective removal is not efficient.

The known membrane-based separation processes always require that a driving force exists between the two sides of the membrane. Known driving forces are: a pressure difference, a concentration difference; application of a uniform electric field in presence of ionizing means.

EP-A-1 892 216 discloses a selective permeation membrane reactor wherein the driving force is provided by a difference of the partial pressure of hydrogen between a supply side and a permeation side of the reactor; said difference can be achieved for instance operating the supply side at a pressure which is significantly higher or lower than the pressure at the permeation side.

U.S. Pat. No. 4,762,535 discloses separation of ammonia from hydrogen and nitrogen by means of a separating membrane containing a selective salt, that influences the ammonia membrane permeation, the driving force being provided by the partial pressure between the two sides of the membranes.

JP2006817 discloses a separation system based on an electric field, membrane and ionizer tool, wherein the molecules are ionized and drawn toward the electrode having opposite charge; the electric field generates a force on the ions allowing to pass through the membrane to achieve the required separation.

It has to be noted that a conventional membrane-based system would not accomplish any separation in absence of at least one of the above mentioned driving forces across the membrane.

Selective membranes are presently adopted (but not limited to) in ammonia and methanol plants for recovery of hydrogen contained in the purge gas of the ammonia or methanol synthesis loop. Said hydrogen recovery is accomplished utilizing selective membranes which exploit the pressure difference as driving force. The synthesis loop purge gas is fed to one of the two sides of the membranes at a high pressure usually in the range 100÷150 bar for ammonia plants and 50÷100 bar for methanol plants; the other side of the membrane is operated at a much lower pressure, for instance 60÷70 bars for ammonia plants and 25÷60 bars for methanol plants. The pressure difference between the two sides of the membranes is the driving force of the process and the partial pressure of hydrogen between the two sides is significantly different. The molecules pass through the membranes with a different extent, and in particular the smallest molecule (hydrogen in this case) is passing with higher concentration.

Another known application of selective permeation is separation of oxygen from the other components of air. Air is delivered on one side of a conducting membrane; the two sides of the conducting membrane are equipped with electrodes which generate an electric field; the oxygen is pumped through the membrane as $O^{2-}$ ions, i.e. electrons flow in the opposite direction to create the oxygen ions, by an electric field which acts as driving force. The oxygen re-acquires electrons in the other side of the membrane producing pure oxygen. The membrane is for example a yttria-doped zirconia membrane.

The membranes of industrial use include polymeric or inorganic membranes, and single-layer or multilayer membranes. Depending on the pore size, the membranes are named macroporous, mesoporous or microporous. The pore size is generally the following: at least 5 nm (nanometers) in a macroporous membrane; 2 to 5 nm in a mesoporous membrane, or less than 2 nm in a microporous membrane.

As stated above, drawbacks of the known membrane-based separation technique are: poor selection between gas molecules having the same size or a similar size; need of a driving force in terms of a significant pressure difference across the membrane, or need of ionization in order to make the molecules sensitive to an electric field. In the field of ammonia or methanol synthesis, the output stream of the reactor contains a significant amount of unconverted reagents. Aiming to recover at least part of said reagents, a relevant fraction of the output stream is usually re-circulated to the reactor; the power demand for compressing back the output stream at the pressure of the chemical reaction, however, affects the overall efficiency of the process.

SUMMARY OF THE INVENTION

The invention aims at overcoming the above drawbacks of the prior art. A purpose of the invention is to provide a novel process for selective removal of at least one component from a gaseous system, e.g. for removal of a gaseous product from a gaseous system where the product is mixed with reagent. This happens for example in an intermediate stage of a chemical reaction. Another purpose is a reactor adapted to carry out the novel process.

The idea underlying the invention is to make use of an induced and/or permanent electric dipole moment (EDM) of gas molecules as driving force of a membrane-based separation. By subjecting the gas systems to a spatially non-uniform electric field, gas molecules having a dipole moment significantly higher than other molecules are made to pass through a porous membrane.

A first aspect of the invention is a process for selective removal of a gaseous product from a gaseous flowing system comprising said product and other components, wherein the gaseous system is flowing through a first environment, which is separated from a second environment by a boundary wall, and a permeation membrane forms at least part of said boundary wall; a spatially non-uniform electric field is generated between a first electrode or first plurality of electrodes located in the first environment and a second electrode or second plurality of electrodes located in the second environment, so that field lines of said non-uniform electric field cross said membrane, and a dielectrophoretic force generated on particles of said gaseous component is at least part of a driving force of the permeation through said membrane, an amount of said product being selectively removed from the first environment and collected in the second environment.

The term product denotes a given gaseous component within the system. Said product could be the product of a chemical reaction, where the gaseous system comprises the reagents of said reaction. The process could remove one product or more products from the same gaseous flowing system, according to different embodiments. The term particles denotes molecules or atoms of the gas. Said first environment is, for instance, a part of a reactor installed in a continuous process.

The electric dipole moment of said product and/or of the other components of the gaseous flowing system can be a permanent dipole moment or an induced dipole moment. An induced electrical dipole moment is generated on polarisable particles by the spatially non-uniform electric field.

The process is applicable when the particles of said product have a permanent electric dipole moment which is greater than the electric dipole moment of particles of other components of the gaseous system. The process is also applicable when the particles of said product have a polarizability which is greater than the polarizability of particles of other components of the gaseous system, so that electric dipole moment induced on the particles of said product by the non-uniform electric field is greater than the electric dipole moment induced by the same field on the other gaseous components of the system.

The permanent dipole moment is an intrinsic feature of particles. A polarisable molecule is a molecule which assumes an electric dipole moment upon application of an external electric field. Polarizability is defined as the ratio of the induced dipole moment to the electric field that produces this dipole moment.

The greater is the difference between the EDM of product and the EDM of the remaining particles, the more the process is selective. In a preferred embodiment, the permanent or induced EDM of molecules of the product to be separated is at least 50% higher than the EDM of any other molecule in the gaseous system. More preferably the EDM of the product to be separated is a multiple of the EDM of any other molecule in the system; preferably said multiple is at least 3; more preferably said multiple is at least 5 or greater.

The electric dipole moment can be measured in Debye (D). Conversion in SI units is given by the equation 1 C·m (coulomb meter)=2.99792458 $10^{29}$ D. In absolute value, the dipole moment of the molecules of the product to be separated should be preferably at least 0.3 D in order to achieve an efficient separation.

The non-uniform electric field is a source of a driving force for a selective permeation through the membrane. The driving force from the electric field can be the sole driving force or a part of the total available driving force. Hence the invention is not dependent purely on pressure as occurs in the prior art membrane separation. In some embodiments of the invention, the first environment and the second environment are substantially at the same pressure, i.e. no or little pressure difference exists across the membrane. In case a difference of pressure exists, said difference of pressure may provide a further driving force. Moreover, the invention does not need a ionizer or equivalent means to induce ionization of the gaseous system.

The spatially non-uniform electric field has preferably at least one of the following features:

a) the line density of the electric field through the surface of electrode(s) having a given sign (i.e. positive or negative) is greater than the line density through the surface of the opposite electrode(s);

b) the magnitude of the electric field is greater on the surface of electrode(s) of a given sign than magnitude of the electric field on the opposite electrode(s);

c) the lines of the electric field are not parallel, i.e. the field lines point at different locations point to different directions.

In a preferred embodiment, positive and negative electrodes having different shapes and/or dimension are used to generate said spatially non-uniform electric field. For instance said non uniform electric field can be generated by electrodes in the form of concentric cylinders. For example two concentric cylindrical electrodes may generate a spatially non-uniform electric field according to the invention.

Preferably the gradient of the electric field is non uniform and there are regions with a higher gradient and regions with a lower gradient. More preferably the regions with a higher or lower gradient correspond to one of the two environments, i.e. to positive or negative electrodes.

The magnitude of the spatially non-uniform electric field may be constant or variable in time.

Particles with a significant EDM are highly sensitive to the electric field, while the same electric field is substantially neutral to particles having no or a much smaller EDM. The above finding is combined with a membrane-based separation in order to achieve an efficient selective removal in cases when the conventional membrane-based selective removal is not satisfactory. Under the driving force of the spatially non-uniform electric field, the molecule(s) with a permanent or induced EDM pass through the permeation membrane at a higher rate that other molecules with no or a smaller EDM.

A preferred application of the invention is separation of gaseous flowing product(s) from reagents contained in a flowing reaction environment, to obtain a better yield of a chemical reaction. A non exhaustive list of preferred application of the invention is the synthesis of: ammonia, methanol, DME, nitric acid, sulphuric acid. The molecules of ammonia and methanol have a significant dipole moment and are particularly suitable for application of the invention. The following table gives some values of dipole moment in Debye (D).

| Molecule | Dipole moment (D) |
|---|---|
| $H_2$ | 0 |
| $N_2$ | 0 |
| $NH_3$ | 1.47 |
| $CH_3OH$ | 1.7 |
| $CO_2$ | 0 |
| CO | 0.11 |
| $H_2O$ | 1.8 |
| $SO_2$ | 1.6 |
| $SO3$ | 0 |
| NO | 0.15 |
| NO2 | 0.33 |

The above values show that ammonia ($NH_3$) can be efficiently separated from the reagents nitrogen ($N_2$) and hydrogen ($H_2$). In contrast, a conventional membrane-based system, for instance using differential pressure as driving force, would not be able to separate ammonia from nitrogen and hydrogen because the size of the ammonia molecule is intermediate between the size of $H_2$ molecule and size of $N_2$ molecule.

It is preferred that the dipole moment of the reagents is null or negligible, but even a small difference between the dipole moment of the product and dipole moment of reagents can be exploited to improve the efficiency of a chemical process. According to some embodiments of the invention, a complete separation of products from reagents is not required and even a mild separation (e.g. 10% of product separation) may suffice to achieve the goal of improved efficiency of the chemical reaction.

In cases where the difference in terms of dipole moment is not significant, a difference in polarizability can be exploited.

The chemical reaction can be carried out in one or more catalytic beds, although this is not essential for carrying out the invention. When the chemical reaction involves catalytic bed(s), the process of the invention can be carried out directly in a catalytic bed, or upstream or downstream a catalytic bed, or between two catalytic beds when more than one bed is used. Embodiments of the invention include: removing a product from a flowing reaction mixture evolving in a catalytic bed, or removing a product from effluent of a catalytic bed, before admission to a further catalytic bed, or removing a product from a partially reacted gaseous flowing mixture in an inter-bed heat exchanger. In multiple-bed embodiments, removal of the reaction products between two catalytic beds, namely from the gaseous mixture exiting a first catalytic bed, allows to feed a more reactive mixture to the second catalytic bed.

The invention is applicable regardless of the flow in the catalytic bed, that can be for example axial, radial, mixed axial-radial, cross flow or horizontal. In some embodiments of the invention, a heat exchanger is embedded in the catalytic bed for isothermal operation, i.e. for keeping the temperature of the bed within a given range by furnishing or removing heat.

The present invention can be combined with an ionizer which would generate ions. A ionizing tool can be added to the layout of the present invention; in this way the effect of the dielectrophoresis force and of the ionizing force can be mutually utilized to increase the separation between reagents and products. For this additional embodiment, the sense of the electric field must be taken into account because the ionizing force has the same sense of the electric vector field.

The main advantage of the invention is the better conversion of the reagents, due to the ability to increase the rate of the conversion by removing products form the flowing system. Generally speaking, a synthesis section of a chemical product, is made more efficient and less energy consuming. Another related advantage is the lower consumption for the feed of the reagents: this advantage is felt e.g. in the field of synthesis of methanol and in the field of synthesis of ammonia, where the power for compression of the make-up gas containing the reagents is significant. The need to consume power for re-circulating the gaseous products is also reduced. Another positive effect of the invention is that the chemical reaction (if exothermic) delivers more heat, due to the better yield of conversion. When the heat removal produces a useful effect, for example heat is removed producing hot steam which is used in the process, a further advantage is produced.

The process is now elucidated in a greater detail.

The spatially non-uniform electric field generates dielectrophoretic force $F_{DEP}$ on the polarised particles. Said force points to the region where the electric field is stronger. This force can be defined by the following formula (I):

$$F_{DEP} = (p \cdot \nabla) E \quad (I)$$

where:
E is the electric field;
p is the (permanent or induced) dipole moment vector;
$\nabla$ is the del operator.

The formula (I) can be further developed considering that the induced dipole moment depends on the volume of the particle and effective polarizability, namely:

$$p = (\alpha + \Omega) \cdot v \cdot E \quad (II)$$

where:
v is the volume of the particle; $\alpha$ is the induced polarizability that can be calculated from the shape of the particles and by dielectric properties including the conductivity and the permittivity, $\Omega$ is the permanent polarizability.

Taking into account the formula (II), the formula (I) is rewritten as:

$$F_{DEP} = \frac{(\alpha + \Omega) \cdot v}{2} \nabla |-E|^2 \quad (III)$$

showing that the sign of the electric field E has no influence on the direction of the force $F_{DEP}$; in other words, even if the sense of the electric field is reversed, the force $F_{DEP}$ and hence the movement of the polarized particles shall be always directed in the same way and pointing to the region where the electric field is stronger.

In some cases $\alpha$ is much greater than $\Omega$ ($\alpha \gg \Omega$) which means that the induced dipole moment is several orders of magnitude lower than the permanent (if present) dipole moment. In these cases the induced EDM can be neglected.

In all the embodiments of the invention, the voltage applied to the electrodes for creating the electric field is preferably around 1000 V and more preferably in the range 1000 to 15000 V (1 to 15 kV). In general the voltage is preferably increased if it is required a stronger force $F_{DEP}$ on particles and therefore a higher separation. The electric field value is preferably in the range 10÷2000 kV/m.

An aspect of the invention is also a reactor adapted to carry out the process, according to the attached claims.

According to preferred embodiments the membrane is based on Alumina, Zirconia, Titania Silica, Carbon and Zeolite. In particular Alumina, Zirconia, Titania are more suited to manufacture mesoporous membranes, while Silica, Carbon and Zeolite are more suited to manufacture microporous membranes.

In a preferred embodiment said membrane is a microporous membranes with a pore diameter<2 nm (2 $10^{-9}$ m). Preferably the electric field dimensions are several times smaller than the dimensions of the membrane pores allowing an efficient electric field development.

The membrane thickness is preferably (but not limited to) less than 10,000 μm and greater than 1,000 μm.

Multilayer membranes are preferred to single layer membranes due to the higher relevant mechanical resistance. The membrane is more preferably manufactured at a temperature at least 100÷150° C. higher than the operating temperature in order to guarantee a higher membrane stability.

The reactor may comprise one or more positive electrodes and one or more negative electrodes. Electrodes can be in any form; examples are elongated electrodes in the form of bars, or substantially two-dimensional electrodes in the form of plates or wall elements, a simple configuration of electrodes which can be used to carry out the invention utilised is made by two coaxial cylinders. The internal electrode in said coaxial arrangement can be made by a straight wire.

The chemical reactor may comprise one catalytic bed or more catalytic beds in a pressure vessel. The electrodes or at least one electrode may be immersed in the catalytic bed. In a preferred embodiment, the membrane forms at least a part of a wall of a catalytic bed, separating the bed from a product collector; a first electrode is immersed in the catalytic bed, and the opposite electrode is outside the bed, preferably in the product collector. The term electrode could denote a plurality of electrodes. Hence, the non-uniform electric field which is formed between the two electrodes, during the use, promotes the passage of products molecules from the catalytic bed towards the product collector.

In a preferred embodiment having a cylindrical symmetry, the catalytic bed has substantially an annular structure and is arranged around a central pipe which constitutes the product collector. A cylindrical wall element immersed in the catalytic bed forms the negative electrode, while one or more positive electrodes are arranged inside the central pipe. A permeable membrane forms a portion of a boundary surface between the annular catalytic bed and the central duct.

Another aspect of the invention is a novel arrangement of a multi-bed converter e.g. for ammonia or methanol. A multi-bed converter comprises a plurality of catalytic beds; a fresh charge of reagents is admitted into a first bed and then further reacted into the following bed(s) in sequence; the reactor further comprises a shell-and-tube indirect inter-bed heat exchanger where a flow of partially reacted gas effluent from one of the catalytic beds is admitted in the shell side and cooled before admission into a further catalytic bed, and a product collector for the effluent of the last catalytic bed. Said converter is characterized by comprising:

a permeation membrane arranged to provide at least a portion of a boundary wall between shell side of said inter-bed exchanger, and said product collector;

at least a first electrode located in the shell side of the inter-bed exchanger, and a second electrode located in the product collector, said first electrode and second electrode having a different shape and being arranged to generate a spatially non-uniform electric field across said membrane when a voltage is supplied to the electrodes.

Said embodiment is applicable for example to a known three-bed, bottle-shaped converter.

The invention will now be elucidated with the help of the following description of preferred and non-limiting embodiments. A numerical example of the advantages achievable in an ammonia plant will be provided.

DETAILED DESCRIPTION OF PREFERRED EMBODIMENTS

Figure 1:
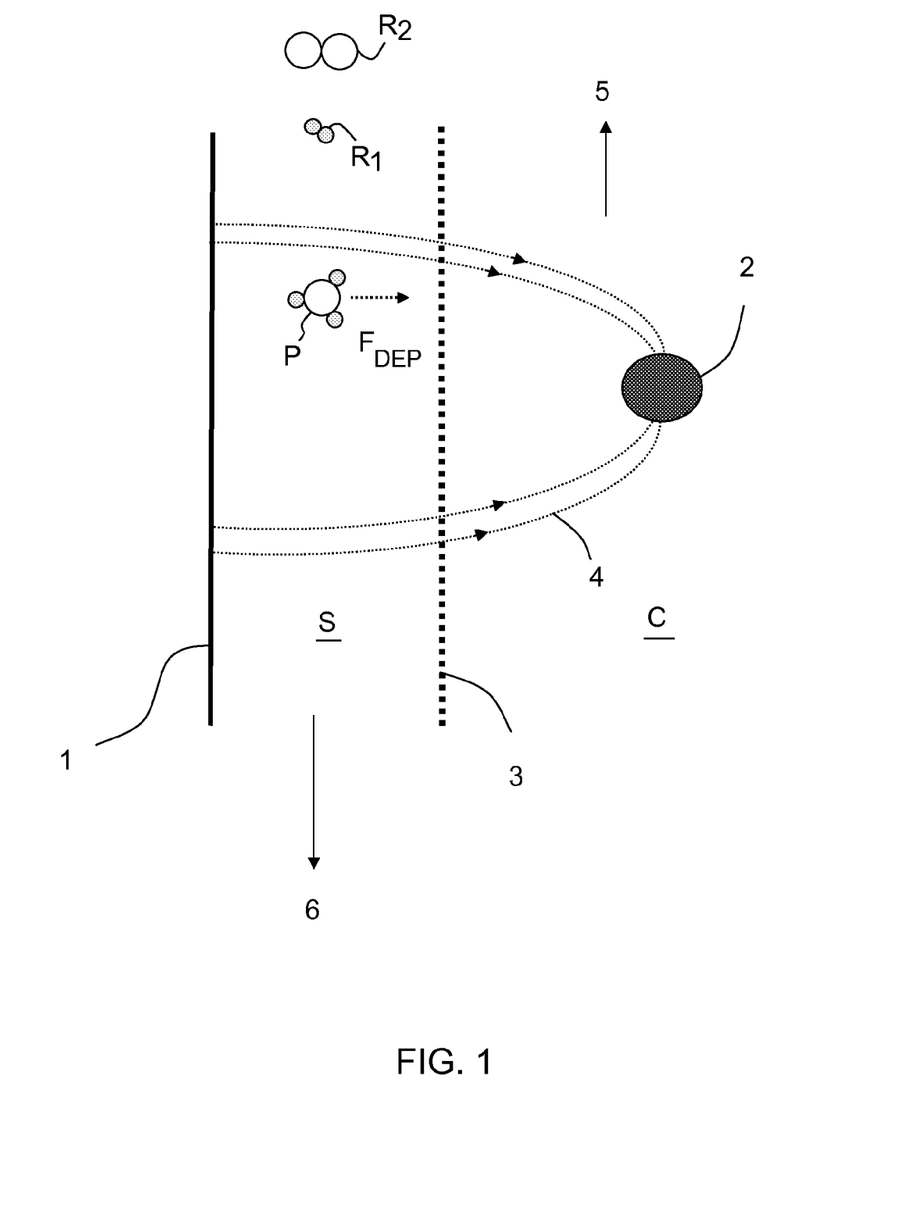
FIG. 1 is a basic scheme of a method for removal of products form a gaseous mixture, according to one embodiment of the invention.

Referring to FIG. 1, numeral 1 denotes a first electrode and numeral 2 denotes a second electrode. The first electrode 1 and the second electrode 2 have a different shape and are located at opposite sides of a permeable membrane 3. The membrane 3 has small pores, for example micropores, allowing gas molecules to pass through, once a driving force is present in the system.

In the example, electrode 1 is negative and electrode 2 is positive but the reverse configuration is also working in the same way; when the electrodes are powered, the lines of the electric field 4 are conventionally arranged according to FIG. 1, originating from the negative electrode 1 and pointing to the positive electrode 2, passing through the membrane 3. Due to different shape of electrodes 1 and 2, a spatially non-uniform electric field is generated. In particular, the field lines are closer (i.e. the field is stronger) near the positive electrode 2.

The membrane 3 forms at least a portion of a boundary surface between a first environment and a second environment. In this example the first environment is a reaction space S and said second environment is a product-collecting region C. Said space S and region C could be for example different environments of a chemical reactor. The space S can be also a separating space between two catalytic beds.

The reaction space S is fed with a make-up gas comprising reagents whose molecules are shown as $R_1$ and $R_2$. Said reagents react to form a product P, possibly in the presence of a catalyst. The molecule of said product P has an electric dipole moment while $R_1$ and $R_2$ are electrically neutral or have a negligible dipole moment, for instance 5 times smaller than the EDM of product P. Hence, molecules of P are much more sensitive to the electrical field 4 than molecules of $R_1$ and $R_2$. Under the action of the electric field 4, the molecules of P undergo a dielectrophoretic force $F_{DEP}$ directed to the positive electrode 2; hence molecules of P tend to pass through the membrane 3 and concentrate around said positive electrode 2. A gaseous product 5 containing product P is obtained in the product-collecting region C This means that a certain amount of product P is continuously removed from the reaction space S, while the flowing reagents $R_1$ and $R_2$ tends to remain in said environment S, being insensitive to the electrical field 4 which drives the molecules of P across the membrane. If the space S is a separating space between reaction stages, then the space S delivers a gaseous stream 6 with a low content of P, which can be more reactive in a further reaction stage.

If molecules of a reagent, for example $R_1$, are allowed to pass through the pores of membrane 3 due to their size, a certain amount of $R_1$ is found in the gaseous product 5. A conventional membrane-based separator in this case would suffer a significant loss of reagent $R_1$ through the membrane, by-passing e.g. a further stage of reaction. According to the invention, the electric field 4 drives the molecules of P towards the membrane, while molecules of $R_1$ remain evenly distributed in the space S. This means that, even if some reagent is lost through the membrane, the $P/R_1$ ratio in the gaseous product 5 is more favourable compared to a conventional membrane-based technique. In other words, the selectiveness of the removal of product P from space S is greater and loss of useful reagent $R_1$ is reduced.

Referring for example to ammonia synthesis, $R_1$ is hydrogen ($H_2$), $R_2$ is nitrogen ($N_2$) and the product P is ammonia ($NH_3$).

A catalytic bed may be provided in the space S. Two examples are given in FIGS. 2 and 3.

Figure 2:
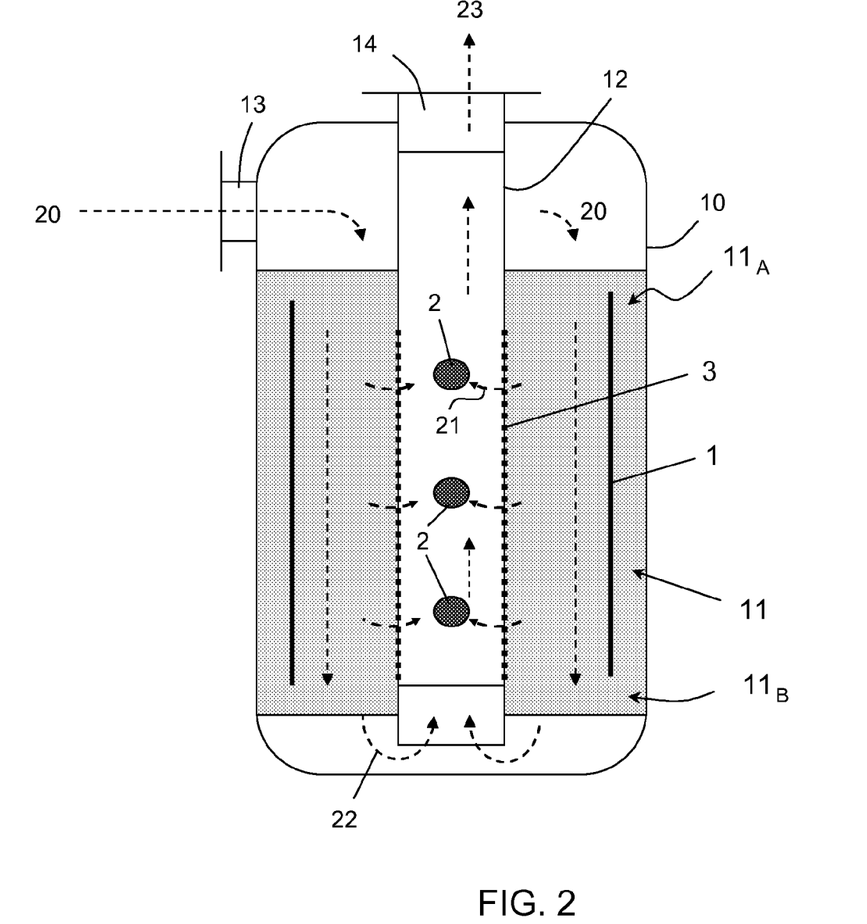
FIG. 2 is a sketch of an axial-radial flow converter according to one of the embodiments of the invention.

FIG. 2 shows a reactor/converter comprising a cylindrical vessel 10 containing an annular catalytic bed 11, arranged around a central duct 12. The bed 11 has an upper region 11A and a lower region 11B. The reagents enter at an inlet 13 and flows axially through the bed 11. Products are collected by the central duct 12, which is in communication with the outlet 14. A tube or plate heat exchanger can be immersed in the catalytic bed 11 to maintain a quasi-isothermal operation. Such arrangement of an axial flow reactor is known, and no further described.

A negative electrode 1 is provided in the form of a cylindrical wall inside the bed 11. A plurality of positive electrodes 2 are placed inside the duct 12. Said positive electrodes 2 have a shape different from shape of the negative electrode 1. A permeable membrane 3 forms a portion of boundary surface between the bed 11 and the duct 12. FIG. 2 is an example of an embodiment with multiple positive electrodes. In general any of the positive and/or negative pole of the electric field can be made with one or more electrodes.

In use, a make-up gas 20 containing the reagents enters at inlet 13, and is gradually converted while flowing axially downward in the bed 11 from top to bottom of the converter. The product stream 23 is formed by a number of intermediate, radial flows 21 passing through the membrane 3, and by a bottom flow 22; in some industrial converters, only the bottom flow 22 provides the outlet gas mixture. The concentration of reagents through the bed 11 gradually vanishes from top to bottom, and the concentration of products increases at the same time. The purpose of the intermediate flows 21 is to remove at least some of the products from the bed, to avoid a too high concentration of products (namely slow reaction) in the lower region 11B of the bed. The electrical field 4 pointing from outer electrode 1 to inner electrodes 2 allows a higher concentration of products in the intermediate radial flows 21. In absence of the electric field, a significant fraction of reagents would escape through the membrane 3 and more products would reach the lower region 11B, with two negative effects: less conversion rate in the lower region 11B of the bed, and less purity of the stream 23. Thanks to the invention, the membrane-based separation of products is made more selective, and conversion rate in the lower region 11B of the catalytic bed is higher than in the prior art.

Figure 3:
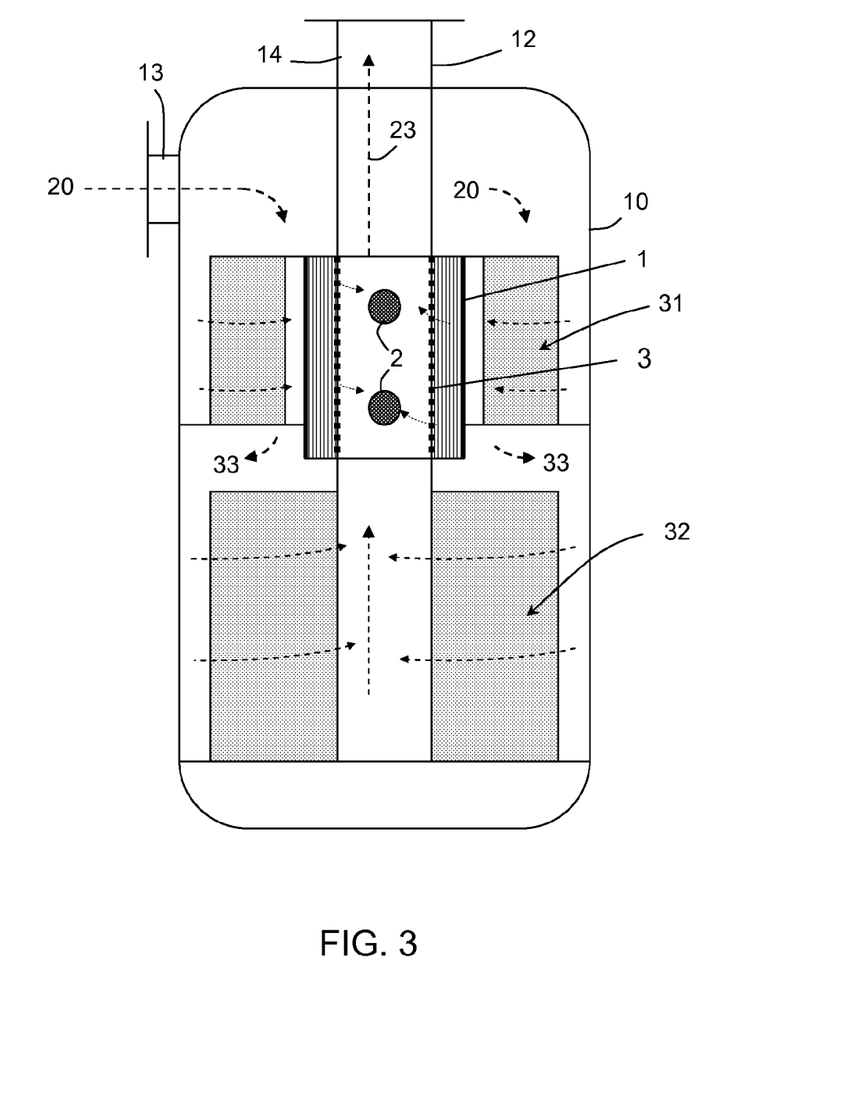
FIG. 3 is a sketch of a converter according to another embodiment of the invention.

FIG. 3 is a typical embodiment for an ammonia synthesis converter. Selective removal of products (e.g. ammonia) takes place in a heat exchanger between two annular catalytic beds 31 and 32 contained in the vessel 10. The electrodes 1 and membrane 3 are cylindrical elements, concentrically arranged at outlet of the first bed 31. Appropriate heat exchange elements, e.g. to cool the gaseous products, are arranged between the electrode 1 and membrane 3. The electrodes 2 are inside the duct or pipe 12, as in the previous example of FIG. 2. The effluent 33 of the first bed 31 is directed to the second lower bed 32. In this case, the benefit of the invention is a better exploitation of the second bed 32. After reaction in bed 31 the gas is cooled and at the same time the ammonia product is partially separated by the reagents through the membrane 3 located in the internal heat exchanger, thanks to the driving force provided by the non-uniform electric field generated by electrodes having different shape. The un-reacted gas exiting from the heat exchanger is then sent to the second bed 32, where the higher reagents/product ratio moves the reaction equilibrium toward the products.

EXAMPLE

An example of application of the invention to a three-bed quenched converter is presented.

Figure 4:
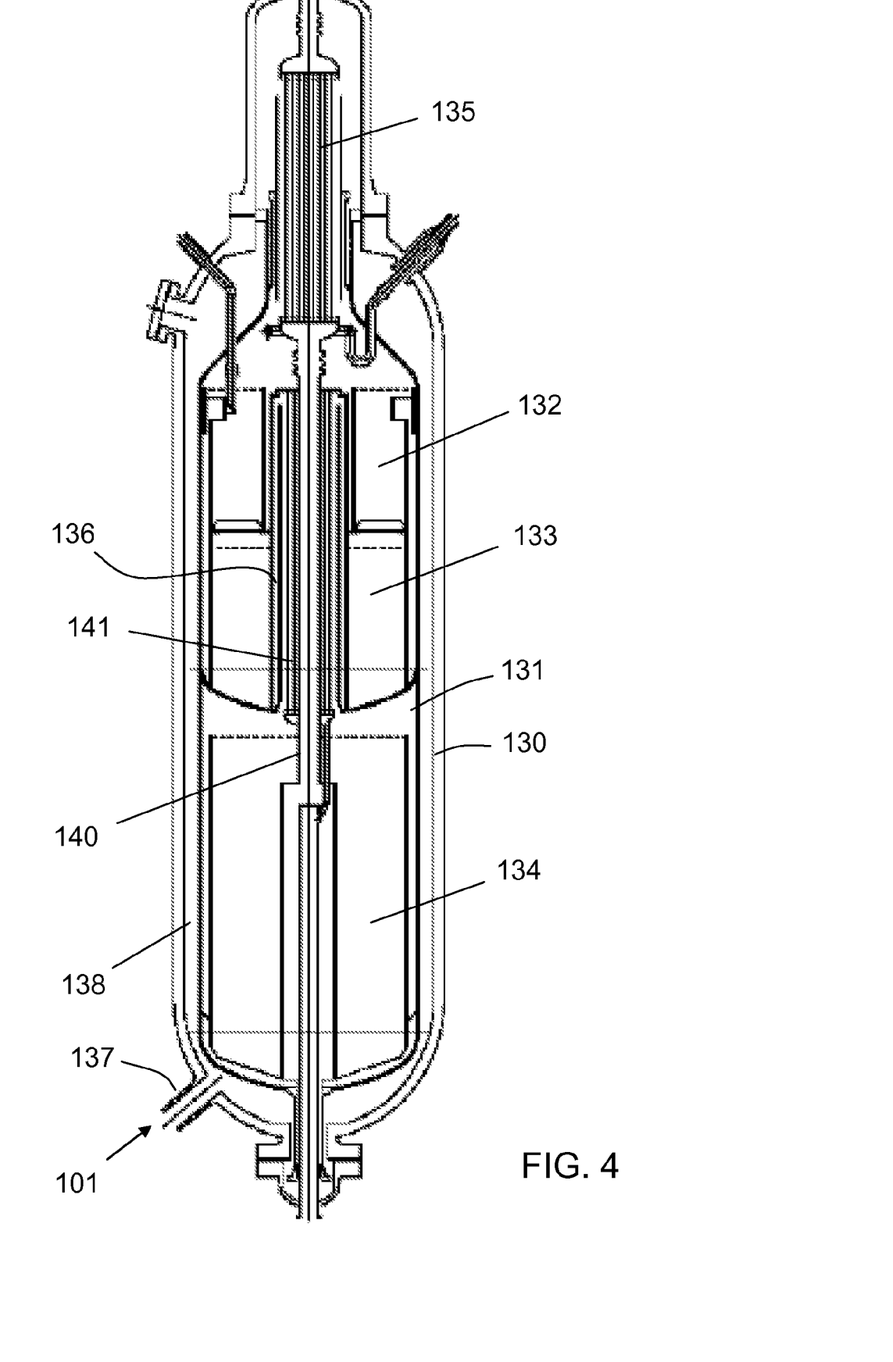
FIG. 4 is a scheme of a three-bed ammonia or methanol converter according to the prior art.
Figure 5:
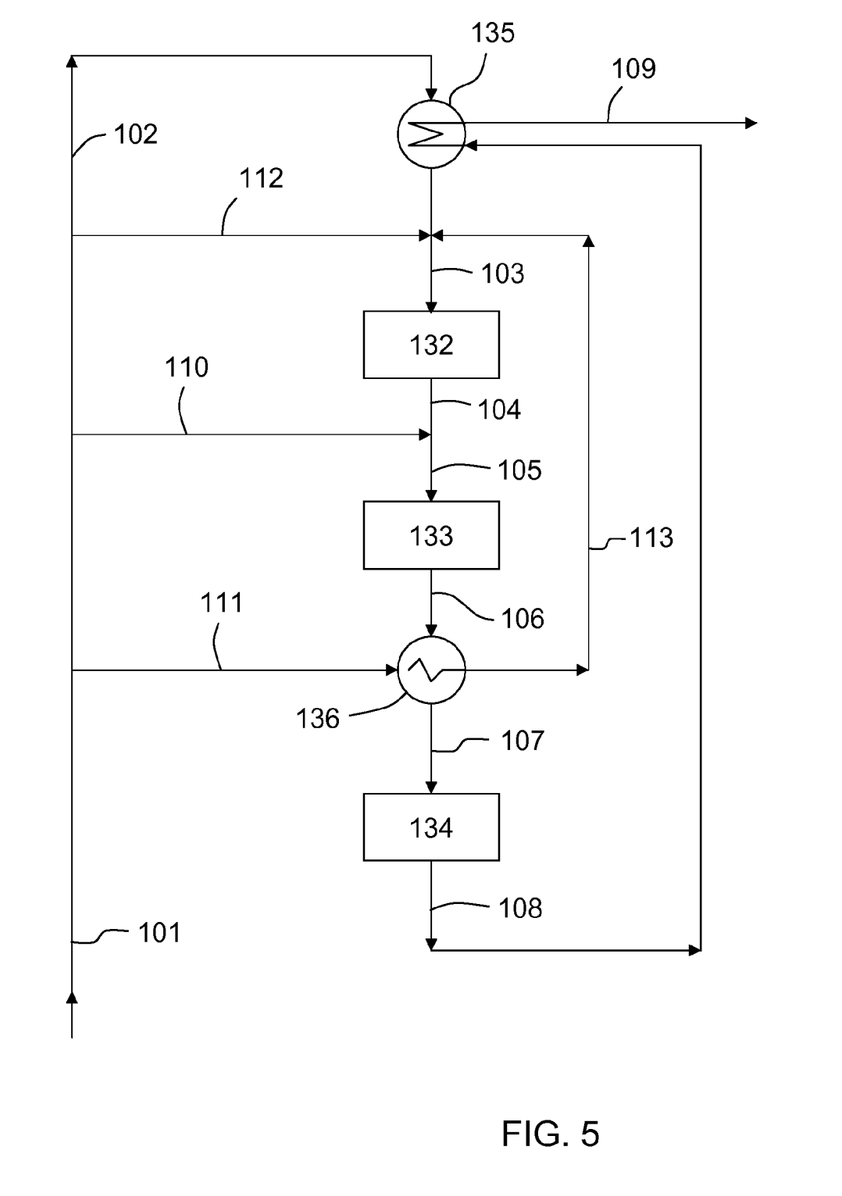
FIG. 5 is a flow diagram of the converter of FIG. 4.

FIG. 4 discloses a bottle shape converter according to a quench-interchanger design. This converter is known e.g. from U.S. Pat. No. 4,735,780 and is not described in detail. FIG. 5 discloses a flow diagram of the converter. Basically, the converter comprises: a vessel 130, a catalytic cartridge 131, said cartridge containing three catalytic bed 132, 133 and 134; a shell-and-tube top preheater 135, an inter-bed heat exchanger 136 traversed by the gas flow between the second bed 133 and the third bed 134. The inter-bed exchanger 136 is a tube bundle heat exchanger.

A feed gas stream 101 enters the converter through a bottom nozzle 137 of the vessel and flows upward flushing the vessel in an annular space 138 between the vessel 130 and the cartridge 131. Having reached the top of the converter, the feed gas enters the shell side of the top preheater 135 where it is preheated by cooling the hot product gas 108 (FIG. 5). The so obtained preheated fresh gas is mixed with the gas current 113 coming from tube side of the interbed exchanger 136. The temperature of the mixture can be controlled by a by-pass 112 of fresh gas.

The gas stream 103 is the result of mixing between preheated fresh gas, said current 113 and eventually the bypass 112. Said stream 103 enters the first and upper bed 132 where it is partially reacted. After leaving the first bed 132 the partially reacted stream 104 is quenched with fresh gas 110; quenched gas 105 then flows through the second intermediate bed 133. The output stream 106 of said second bed 133 is cooled down in the shell side of interbed exchanger 136, before entering the third bed 134, by heating a balance stream of feed gas 111 flowing in the tubes of the exchanger 136 and forming the aforesaid current 113.

The cooled, partially reacted gas 107, which is a mixture of reagents and products, is further reacted in the third bed 134. After leaving the third bed 134, the gas stream 108, now converted into a product gas, passes through the tube side of the top preheater 135 in order to preheat the fresh charge 102 of reagents. The cooled stream 109 is the product gas stream delivered by the converter.

The hot product stream 108 is collected in a central duct 140 and directed via said duct from outlet of the bottom catalytic bed 134 to the upper preheater 135. A tube wall 141 is the boundary wall separating said duct 140 from the inter-bed annular exchanger 136 (FIG. 4).

The following table 1 and table 2 contain an example of flow rates and temperatures.

TABLE 1 operating conditions inside the ammonia converter of FIG. 4

| Stream # | Flow rate kg mole/h | Temperature ° C. | Pressure barg |
|---|---|---|---|
| 101 | 26020 | 133.5 | 131.5 |
| 102 | (*) | 133.5 | 131.5 |
| 103 | 20070 | 395.0 | 131 |
| 104 | 18890 | 492.2 | 130.5 |
| 105 | 24840 | 411.2 | 130.5 |
| 106 | 23900 | 471.4 | 130.1 |
| 107 | 23900 | 375.0 | 129.8 |
| 108 | 23000 | 434.1 | 129.5 |
| 109 | 23000 | 327.2 (**) | 129.0 |
| 110 | 5950 | 133.5 | 131.5 |
| 111 | 9000 | 133.5 | 131.5 |
| 112 | (*) | 133.5 | 131.5 |

(*) Flows 102 + 112 = 11070 kgmole/h
(**) Adiabatic outlet temperature, not accounting for heat losses

TABLE 2 composition inside the ammonia converter of FIG. 4.

| Bed # | | Gas Composition, % mol. | | | | |
|---|---|---|---|---|---|---|
| | | $NH_3$ | $H_2$ | $N_2$ | $CH_4$ | Ar |
| 132 | IN | 1.91 | 67.55 | 17.68 | 9.10 | 3.76 |
| (upper) | OUT | 8.28 | 62.40 | 15.66 | 9.67 | 3.99 |
| 133 | IN | 6.75 | 63.63 | 16.14 | 9.53 | 3.94 |
| (interm.) | OUT | 10.94 | 60.25 | 14.82 | 9.90 | 4.09 |
| 134 | IN | 10.94 | 60.25 | 14.82 | 9.90 | 4.09 |
| (lower) | OUT | 15.30 | 56.70 | 13.43 | 10.29 | 4.25 |
| CONVERTER OUT | | 15.30 | 56.70 | 13.43 | 10.29 | 4.25 |

Figure 6:
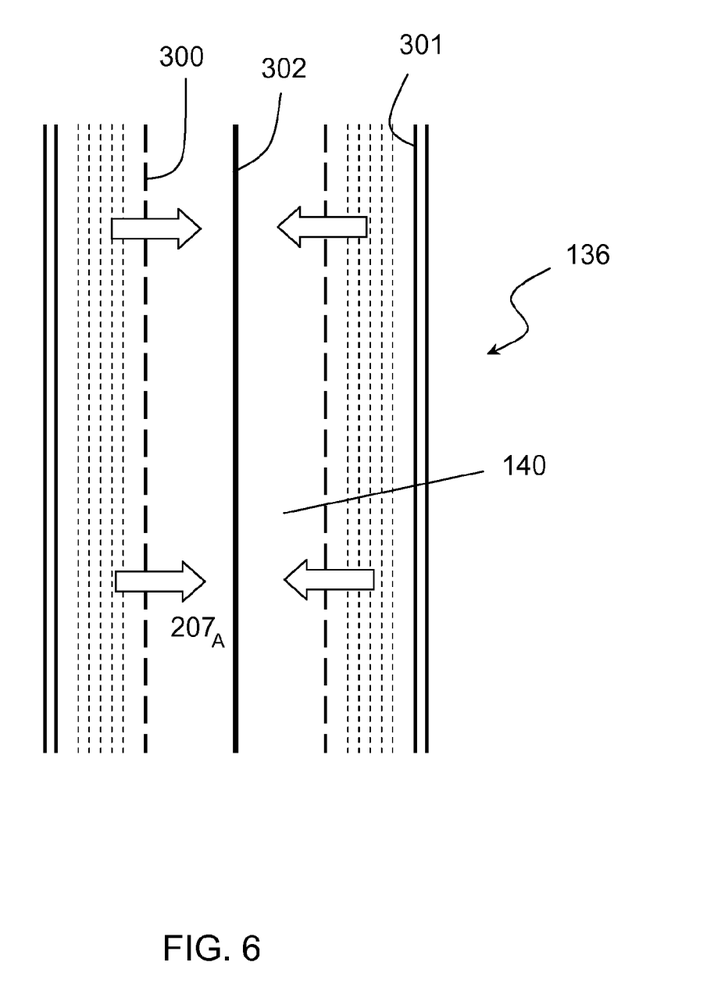
FIG. 6 is a scheme of a modification that can be made to a part of the converter of FIG. 4, in order to carry out the present invention.
Figure 7:
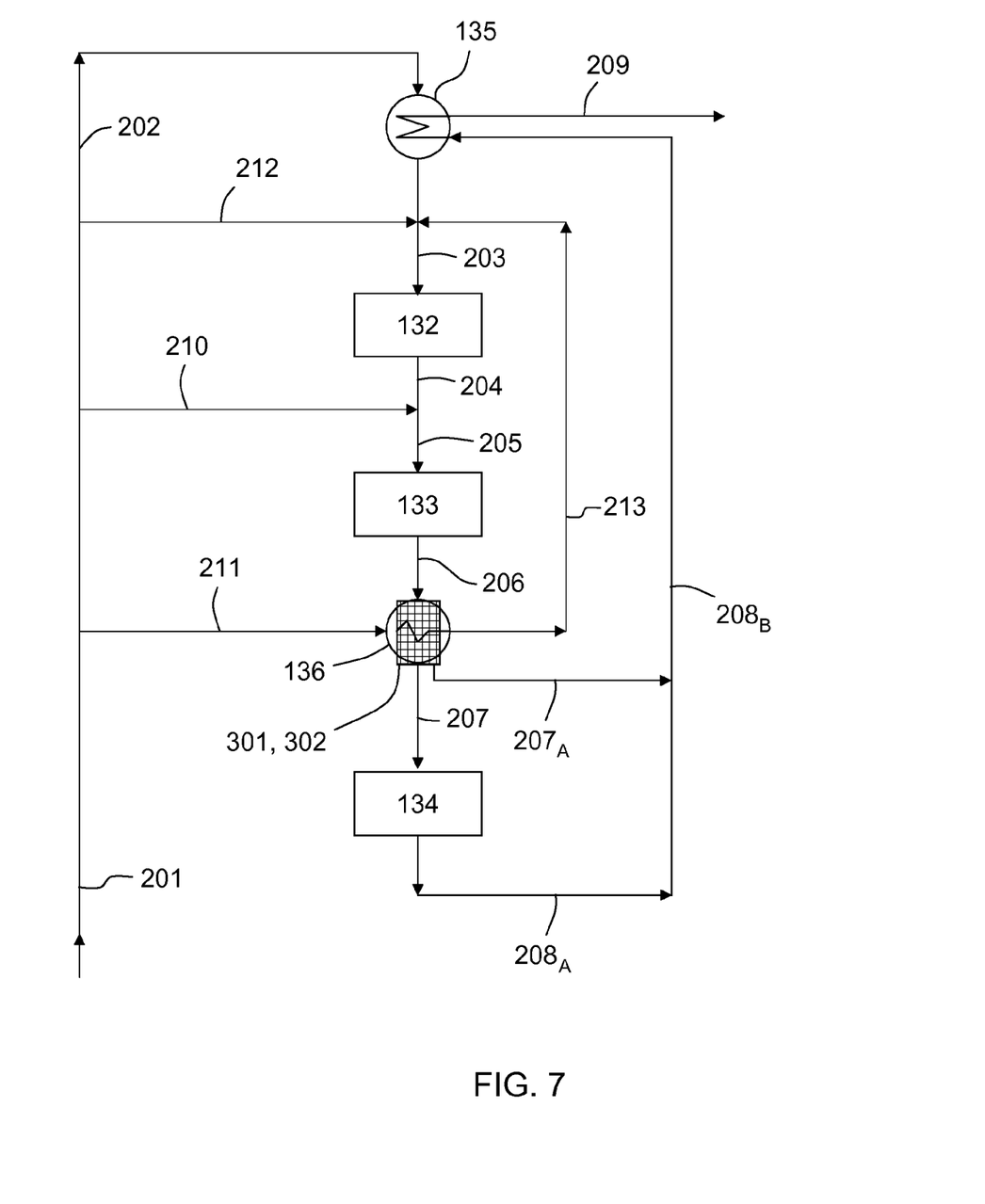
FIG. 7 is a flow diagram of the modified converter according to FIG. 6.

The converter is modified by the following steps (FIGS. 6, 7). FIG. 6 shows a sketch of the inter-bed exchanger 136, where the thin dotted lines denote the tube bundle.

At least a portion of the tube wall 141 is replaced by a microporous zeolite based permeation membrane 300. Said membrane 300 separates a first environment which is the shell side of the inter-bed heat exchanger 136, from the product gas collection duct 140.

A first electrode 301 is installed in the form of a hollow metallic cylinder located in correspondence of the shell of the inter-bed exchanger 136. A second electrode 302 is located inside the pipe 140. This internal electrode 302 can be a positive or negative charged wire. Then, the membrane 300 is now located between the internal electrode 302 and external electrode 301. Electrodes are connected to a suitable power source. In use, the voltage applied is 5000 volts and the electric field value is about 50 kV/m.

When no tension is applied, the membrane 300 is behaving like a monolithic separating wall. When tension is applied, the two concentric cylinder electrodes 301 and 302 create a non-uniform electric field, which generates a driving force for polarized particles (or particles having a permanent EDM) to pass through the membrane 300. Due to this permeation through membrane 300, an ammonia-rich flow $207_A$ is separated from the gaseous mixture in the shell side of the inter-bed exchanger 136. Said flow $207_A$ passes through the membrane 300 and into the collector 140. This removes ammonia from the mixture in the shell-side of the exchanger, which will form the input stream 207 directed to the third bed 134. Removing ammonia makes said stream 207 more reactive, since concentration of reagents is made higher. In other words, the conversion rate in the third bed 134 will be increased compared to the conventional design.

The ammonia-rich flow $207_A$ is for example joined t the product ammonia stream $208_A$ originating from the third bed and raising up in the collector 140, to form the product stream $208_B$ (FIG. 7). Other streams, such as 201, 203, 213, etc., are the same as those shown in FIG. 5 and described with equivalent reference numerals 101, 103, 113, etc., and are not further described.

The performance of the modified converter, assuming the same start of run conditions and the same border conditions (feeding gas composition, temperature and pressure) of the base case example, have been calculated as follows.

TABLE 3 operating conditions inside the modified ammonia converter.

| Stream # | Flowrate [kgmole/h] | Temperature [° C.] | Pressure [barg] |
|---|---|---|---|
| 201 | 26020 | 133.5 | 131.5 |
| 202 | (*) | 133.5 | 131.5 |
| 203 | 20070 | 395.0 | 131 |
| 204 | 18890 | 492.2 | 130.5 |
| 205 | 24840 | 411.2 | 130.5 |
| 206 | 23900 | 471.4 | 130.1 |
| 207 | 23120 | 375.0 | 129.8 |
| 207A | 790 | 375.0 | 129.8 |
| $208_A$ | 21950 | 454.8 | 129.5 |
| $208_B$ (***) | 22740 | 451.1 | 129.5 |
| 209 | 22740 | 344.4 (**) | 129.0 |
| 210 | 5950 | 133.5 | 131.5 |
| 211 | 9000 | 133.5 | 131.5 |
| 212 | (*) | 133.5 | 131.5 |

(*) Flows 202 + 212 = 11070 kgmole/h
(**) Adiabatic outlet temperature, not accounting for heat losses
(***) After mixing between the 3rd bed outlet and the ammonia coming from the membrane 300

TABLE 4 composition inside the modified ammonia converter.

| Bed # | | Gas Composition, % mol. | | | | |
|---|---|---|---|---|---|---|
| | | $NH_3$ | $H_2$ | $N_2$ | $CH_4$ | Ar |
| 132 | INLET | 1.91 | 67.55 | 17.68 | 9.10 | 3.76 |
| | OUTLET | 8.28 | 62.40 | 15.66 | 9.67 | 3.99 |
| 133 | INLET | 6.75 | 63.63 | 16.14 | 9.53 | 3.94 |
| | OUTLET | 10.94 | 60.25 | 14.82 | 9.90 | 4.09 |
| 134 | INLET | 7.92 | 62.29 | 15.32 | 10.24 | 4.23 |
| | OUTLET | 13.64 | 57.64 | 13.48 | 10.78 | 4.45 |
| STREAM 207A | | 100 | 0 | 0 | 0 | 0 |
| OUT CONVERTER | | 16.62 | 55.65 | 13.02 | 10.41 | 4.30 |

The ammonia conversion across the ammonia converter is increased by about 1.3% passing from 15.3% mol (see table 2, output of converter) to 16.62% mol (see table 4), increasing the ammonia plant production or, without capacity increase, decreasing at the same time the synthesis loop circulation and the specific duty on the ammonia synthesis loop chiller. The higher converter outlet temperature (344.4° C. vs 327.2° C.) increases also the heat recovery in the synthesis loop decreasing the plant energy consumption. The application of this invention decrease the ammonia plant energy consumption of 0.1÷0.3 Gcal for each metric ton of ammonia produced. The ammonia conversion can be further increased, by increasing the voltage applied between the electrodes.

The invention claimed is:

1. A process for selective removal of a gaseous product from a gaseous system comprising said product and other components the method comprising the steps of:

admitting the gaseous system to a first environment, which is separated from a second environment by a boundary wall, and a permeation membrane forms at least part of said boundary wall; and generating a spatially non-uniform electric field between a first electrode or first plurality of electrodes located in the first environment and a second electrode or second plurality of electrodes located in the second environment, so that field lines of said non-uniform electric field cross said membrane, and a dielectrophoretic force generated on particles of said gaseous product is a driving force of the permeation through said membrane, an amount of said product being selectively removed from the first environment and collected in the second environment, the particles of said product having a permanent electric dipole moment which is greater than the electric dipole moment of particles of other components of the gaseous system or the particles of said product having a polarizability which is greater than the polarizability of particles of other components of the gaseous system, so that electric dipole moment induced on the particles of said product by the non-uniform electric field is greater than the electric dipole moment induced by the same field on the other components of the system.

2. The process according to claim 1, the permanent or induced electric dipole moment of said product being at least 50% greater than the permanent or induced electric dipole moment of the other component of the gaseous system.

3. The process according to claim 2, the permanent or induced dipole of said product is at least 3 times greater than the permanent or induced electric dipole moment of the other component of the gaseous system.

4. The process according to claim 1, said electric field being non-uniform due to said first electrode having a different shape from said second electrode.

5. The process according to claim 4, said electric field having radially-directed field lines from a first electrode to a second electrode, the first electrode being a cylindrical surface, the second electrode being a cylindrical surface or wire coaxial to the first electrode.

6. The process according to claim 1, said first environment and said second environment being substantially at the same pressure.

7. The process according to claim 1, the voltage applied to said electrodes being in the range 1000 to 15000 V.

8. The process according to claim 1, the magnitude of said spatially non-uniform electric field being in the range 10-2000 kV/m.

9. The process according to claim 1, said product to be removed being the product of a chemical reaction, and other components of the gaseous system comprising the reagents of said chemical reaction, the selective removal of said product being carried out directly in a catalytic bed for said reaction, or upstream or downstream a catalytic bed, or between two catalytic beds.

10. The process according to claim 8, said product being any of ammonia, methanol, DME, nitric acid, sulphuric acid.

11. A chemical reactor comprising:
an inlet for a charge of reagents,
a reaction space and a product collector,
a permeation membrane arranged to provide at least a portion of a boundary wall between a first environment and a second environment inside the reactor, said first environment being a portion of said reaction space or an environment of the reactor fed with reagents or with a mixture of reagents and products in an intermediate position between adjoining reaction spaces, and said second environment being the product collector or a part thereof;

at least a first electrode and a second electrode, the first electrode being located in said first environment and the second electrode being located in the second environment, said first electrode and second electrode having a different shape and being arranged to generate a spatially non-uniform electric field across said membrane when a voltage is supplied to the electrodes; and a catalytic bed having substantially an annular structure and being arranged around a central pipe which constitutes said product collector, the negative electrode being a cylindrical wall element immersed in the catalytic bed, and one or more positive electrodes being arranged inside said central pipe, and said permeable membrane forming a portion of a boundary surface between said annular catalytic bed and said central pipe.

12. The reactor according to claim 11, said membrane being based on a material chosen between: Alumina, Zirconia, Titania Silica, Carbon and Zeolite.

13. The reactor according to claim 11, said electrodes being elongated electrodes in the form of bars, or substantially two-dimensional electrodes in the form of plates or wall elements, or two coaxial cylinders, or a straight wire forming an internal electrode and a cylinder coaxial to said wire forming an external electrode.

14. A chemical reactor comprising:
an inlet for a charge of reagents,
a reaction space and a product collector,
a permeation membrane arranged to provide at least a portion of a boundary wall between a first environment and a second environment inside the reactor, said first environment being a portion of said reaction space or an environment of the reactor fed with reagents or with a mixture of reagents and products in an intermediate position between adjoining reaction spaces, and said second environment being the product collector or a part thereof;

at least a first electrode and a second electrode, the first electrode being located in said first environment and the second electrode being located in the second environment, said first electrode and second electrode having a different shape and being arranged to generate a spatially non-uniform electric field across said membrane when a voltage is supplied to the electrodes; and an upper catalytic bed and a lower catalytic bed, both having an annular structure, the upper bed and the lower bed being arranged around a central product collector pipe, the electrodes and membrane being arranged coaxially at the outlet of the first bed and at the inlet of the second bed.

15. A chemical reactor comprising:
an inlet for a charge of reagents,
a reaction space and a product collector,
a permeation membrane arranged to provide at least a portion of a boundary wall between a first environment and a second environment inside the reactor, said first environment being a portion of said reaction space or an environment of the reactor fed with reagents or with a mixture of reagents and products in an intermediate position between adjoining reaction spaces, and said second environment being the product collector or a part thereof; and at least a first electrode and a second electrode, the first electrode being located in said first environment and the second electrode being located in the second environment, said first electrode and second electrode having a different shape and being arranged to generate a spatially non-uniform electric field across said membrane when a voltage is supplied to the electrodes, wherein the reactor is a multi-bed converter comprising a plurality of catalytic beds wherein a fresh charge of reagents is admitted into a first bed, and then further reacted into the following bed(s) in sequence, the reactor further comprising a shell-and-tube indirect inter-bed heat exchanger where a flow of partially reacted gas effluent from one of the catalytic beds is admitted in the shell side and cooled before admission into a further catalytic bed, and comprising a product collector for the effluent of the last catalytic bed, characterized by comprising:

a permeation membrane arranged to provide at least a portion of a boundary wall between shell side of said inter-bed exchanger, and said product collector;

at least a first electrode located in the shell side of the inter-bed exchanger, and a second electrode located in the product collector, said first electrode and second electrode having a different shape and being arranged to generate a spatially non-uniform electric field across said membrane when a voltage is supplied to the electrodes.

* * * * *